(12) United States Patent
Yagnik et al.

(10) Patent No.: US 8,805,090 B1
(45) Date of Patent: Aug. 12, 2014

(54) MATCHING BASED UPON RANK

(75) Inventors: Jay Yagnik, Santa Clara, CA (US);
Sergey Ioffe, Mountain View, CA (US)

(73) Assignee: Google Inc., Mountain View, CA (US)

( * ) Notice: Subject to any disclaimer, the term of this patent is extended or adjusted under 35 U.S.C. 154(b) by 261 days.

(21) Appl. No.: 13/368,317

(22) Filed: Feb. 7, 2012

(51) Int. Cl.
*G06K 9/68* (2006.01)

(52) U.S. Cl.
USPC ........... 382/218; 382/219; 382/220; 382/190; 382/170; 382/229; 707/706; 707/709; 707/727

(58) Field of Classification Search
CPC ...... G06K 9/6202; G06K 9/62; G06K 9/6215
USPC .......... 382/218–220, 190, 170, 229; 707/709, 707/706, 727
See application file for complete search history.

(56) References Cited

U.S. PATENT DOCUMENTS

| | | | |
|---|---|---|---|
| 7,587,064 | B2 | 9/2009 | Owechko et al. |
| 7,801,339 | B2 | 9/2010 | Sidlauskas et al. |
| 7,804,984 | B2 | 9/2010 | Sidlauskas et al. |
| 2008/0025579 | A1 | 1/2008 | Sidlauskas et al. |
| 2008/0025580 | A1 | 1/2008 | Sidlauskas et al. |
| 2008/0109454 | A1* | 5/2008 | Willse et al. ................. 707/100 |
| 2010/0322480 | A1 | 12/2010 | Banerjee et al. |
| 2011/0026781 | A1 | 2/2011 | Osadchy et al. |
| 2011/0219012 | A1* | 9/2011 | Yih et al. ..................... 707/749 |

OTHER PUBLICATIONS

Chum, et al, "Near Duplicate Image Detection: min-Hash and tf-idf Weighting", BMVC, 2008.*

Lu, Jian, "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.

Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed May 30, 2012.

Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.

Lu, Jian, "Video fingerprinting for copy identification: from research to industry applications," Proceedings of SPIE—Media Forensics and Security XI, vol. 7254, Jan. 2009, http://idm.pku.edu.cn/jiaoxue-MMF/2009/VideoFingerprinting_SPIE-MFS09.pdf, Last accessed May 30, 2012.

* cited by examiner

*Primary Examiner* — Ruiping Li
(74) *Attorney, Agent, or Firm* — Amin, Turocy & Watson, LLP

(57) ABSTRACT

Systems and methods for measuring consistency between two objects based upon a rank of object elements instead of based upon the values of those object elements. Objects being compared can be represented by d-dimension feature vectors, U and V, where each dimension includes an associated value. U and V can be converted to rank vectors, P and Q, where values of U and V dimensions are replaced by an ordered rank or a function thereof. Analysis directed to the consistency between U and V can be accomplished by determining consistency between P and Q, which can be more efficient and more accurate, particularly with regard to illumination-invariant comparisons.

20 Claims, 11 Drawing Sheets

MATCHING BASED UPON RANK

TECHNICAL FIELD

This disclosure generally relates to matching objects represented by feature vectors based upon rank vectors rather than based upon corresponding values associated with the feature vectors.

BACKGROUND

When comparing two objects, conventional approaches focus on a lengthy analysis of associated feature vectors. For example, if a first object is represented by feature vector, U, and a second object is represented by feature vector, V, then the conventional approach is to compare the dimensions of U to corresponding dimensions of V in order to determine distance measures.

For example, suppose the two objects in question are both 16×16 pixel images. In that case, both U and V will have 256 dimensions, one for each pixel, and each of those dimensions will include a representative pixel value that reflect the encoded characteristics of the pixel (e.g., an RGB value). As such, the distance between the first pixel of U (e.g., $u_1$) and the first pixel of V (e.g., $v_1$) can be computed based upon a difference between the values of $u_1$ and $v_1$. If the values for $u_1$ and $v_1$ are similar, then the calculated distance will be small. Similar comparisons can be made for all 256 pixels and a total distance between U and V can be determined based upon a sum of the individual distances for each of the dimensions of U and V. This total distance between U and V can be representative of the consistency between the two objects.

Conventional distance measures focus on the exact values of the dimensions and are therefore sensitive to changes in or differences between the values. However, many types of comparisons are less sensitive to dimension values and more sensitive to other characteristics. Furthermore, computations based upon the values can be resource-intensive; particularly when the number of dimensions for U and V are large or when corresponding values of the dimensions are large or complex.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems and methods disclosed herein relate to matching objects represented by feature vectors based upon a rank or order of feature vector dimensions rather than based upon values of those dimensions. A receiving component can be configured to receive a first feature vector, U, associated with a reference object and a second feature vector, V, associated with a comparison object, wherein U and V are d-dimensional vectors. A sorting component can be configured to construct a first rank vector, P, based upon a sequential ordering of dimensions of U, and a second rank vector, Q, based upon a sequential ordering of dimensions of V. A comparing component can be configured to determine a consistency score between P and Q. A matching component can be configured to identify a sufficient match between at least a portion of the reference object and at least a portion of the comparison object based upon the consistency score between P and Q.

For example, the reference object can be a reference image and the comparison object can be a comparison image. In this case, dimensions from 1 to d associated with U and V can relate to pixel values (or other image features) of the reference image and the comparison image, respectively. As another example, the reference object can be a reference audio and the comparison object can be a comparison audio. In this case, dimensions from 1 to d associated with U and V can relate to wavelet values (or other audio features) of the reference audio and the comparison audio, respectively. As another example, the reference object can be a reference text and the comparison object can be a comparison text. In this case, dimensions from 1 to d associated with U and V can relate to a word count (or other text features) of the reference text and the comparison text, respectively The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION OVERVIEW

Figure 1:
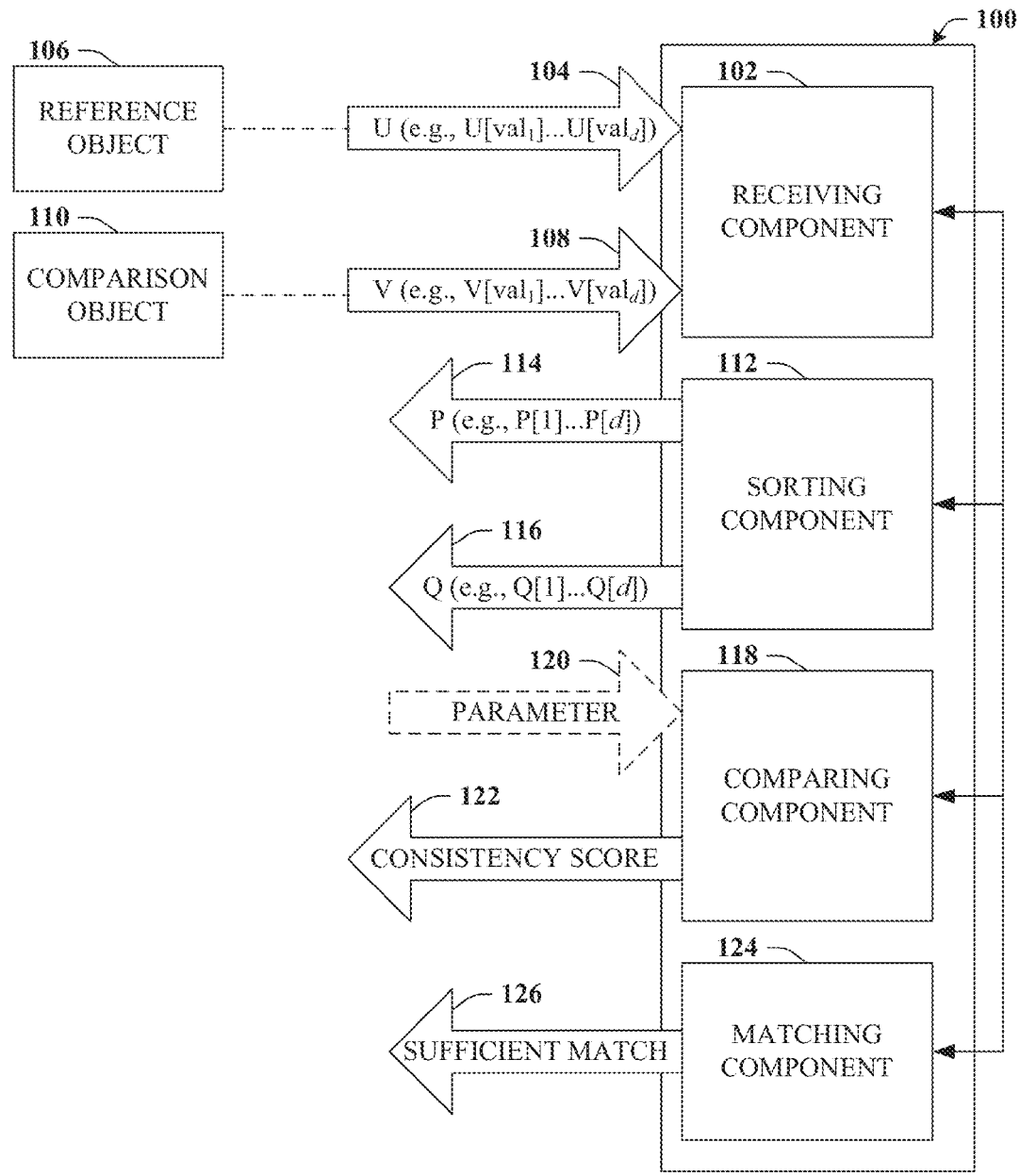
FIG. 1 illustrates a high-level block diagram of an example system that can match objects represented by feature vectors based upon a rank or order of dimensions rather than based upon values of the dimensions in accordance with certain embodiments of this disclosure.

Systems and methods disclosed herein relate to matching objects represented by feature vectors based upon a rank or order of dimensions rather than based upon values of the dimensions. Matching based upon ranks can be more efficient, and in certain domains, analysis based upon rank can be more stable or meaningful.

For example, conventional feature vector matching can arrive at various distance measure based upon a comparison of values for corresponding dimensions of the feature vectors. In contrast, certain embodiments of this disclosure can measure consistency between two vectors, U and V, based upon an order (as opposed to a value) of the dimensions of those vectors U and V.

For instance, consider the case in which two images are identical except that one of the images is saturated or has a much higher illumination scale than the other. As another example, consider the case in which two audio tracks are identical or have an identical voice print, but one is saturated or has a much higher volume than the other. In both cases, the two objects are quite similar. However, values in respective feature vector dimensions for those two objects can be very dissimilar. As a result, conventional approaches may determine the two objects are not similar or are not consistent.

In contrast, embodiments of the disclosure can construct rank vectors P and Q that correspond to U and V, respectively. P and Q are not required to preserve the values of U and V, but instead to preserve the order of U and V after U and V have been sequentially ordered based upon dimension values. Thus, an element of P, $p_i$=r if, when sorting the dimensions of U, the i-th dimension goes to rank position r. Similarly, an element of Q, $q_i$=r if, when sorting the dimensions of V, the i-th dimension goes to rank position r. Depending upon the application, smaller ranks (r=1, 2, . . . ) can be weighted to have more importance, while in other applications the reverse can be true. Once P and Q have been constructed, then matching computations for determining a consistency between the reference object (or a portion thereof) and the comparison object (or a portion thereof) can be achieved by analyzing rank vectors P and Q rather than by analyzing feature vectors U and V alone.

Example Matching Based Upon Rank

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

Referring now to FIG. 1, a system 100 is depicted. System 100 can match objects represented by feature vectors based upon a rank or order of dimensions rather than based upon values of the dimensions. System 100 can include a memory that stores computer executable components and a processor that executes computer executable components stored in the memory, examples of which can be found with reference to FIG. 10. In addition, system 100 can include a receiving component 102, a sorting component 112, a comparing component 118, and a matching component 124.

Receiving component 102 can be configured to receive first feature vector 104, denoted, U. U can be associated with reference object 106. Receiving component 102 can also receive second feature vector 108, denoted, V, which can be associated with comparison object 110. First feature vector 104 (e.g., U) and second feature vector 108 (e.g., V) can be d-dimensional vectors, where d can be, e.g., any positive integer. The d dimensions of U or V can relate to distinct features associated with reference object 106 and comparison object 110, respectively, as further detailed in connection with FIG. 2.

Figure 2:
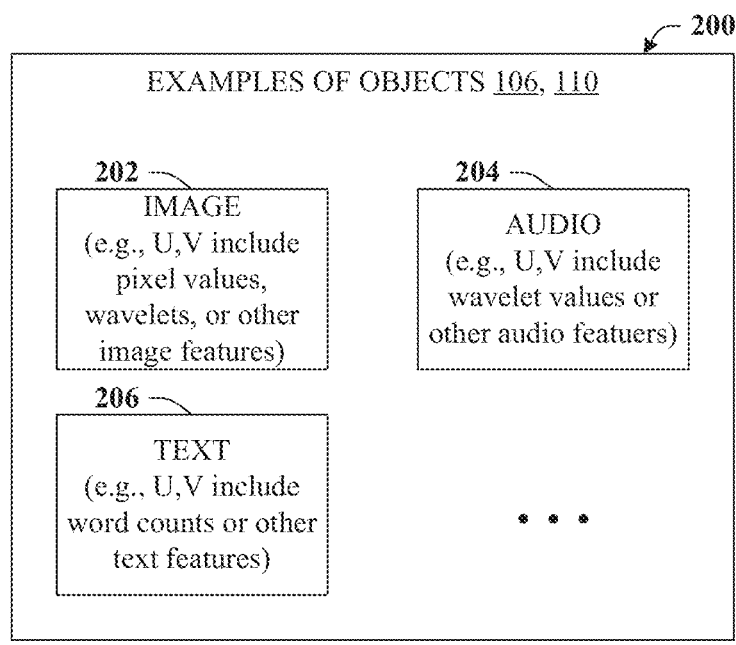
FIG. 2 depicts an example block diagram that illustrates various examples of a reference object or comparison object in accordance with certain embodiments of this disclosure.

While still referring to FIG. 1, but turning now as well to FIG. 2, diagram, 200 is depicted. Diagram 200 illustrates various examples of a reference object or comparison object. For example, objects 106, 110 can relate to at least one of image 202, audio 204, and/or text 206. In the case where objects 106, 110 relate to image 202, feature vectors 104, 108 (e.g., U and V) can include an image feature such as pixel values for example. For instance, first feature vector 104 can include pixel values for the pixels of a reference image and second feature vector 108 can include pixel values for the pixels of a comparison image. In other embodiments, feature vectors 104, 108 can include wavelets or other features (including, for example, local features) associated with the reference image and comparison image. In the case where objects 106, 110 relate to audio 204, then first feature vector 104 can include wavelet values (or other features associated with audio) for the wavelets of a reference audio and second feature vector 108 can include wavelet values (or other features associated with audio) for the wavelets of a comparison audio, for example. In the case where objects 106, 110 relate to text 206, then first feature vector 104 can include a word count for various words (or other features associated with text) included in a reference text and second feature vector 108 can include a word count for various words (or other features associated with text) in a comparison text, for example. Examples 202, 204, and 206 are non-limiting and other examples can exist such as substantially any object that can be represented by a d-dimensional feature vector.

Turning back to FIG. 1, sorting component 112 can be configured to construct first rank vector 114, denoted, P, and second rank vector 116, denoted Q. P can be constructed based upon a sequential ordering of dimensions of U (e.g., first feature vector 104), and Q can be constructed based upon a sequential ordering of dimension of V (e.g., second feature vector 108). Additional detail with respect to sorting component 112 can be found in connection with FIG. 3, which is now referenced before continuing the description of FIG. 1.

Figure 3:
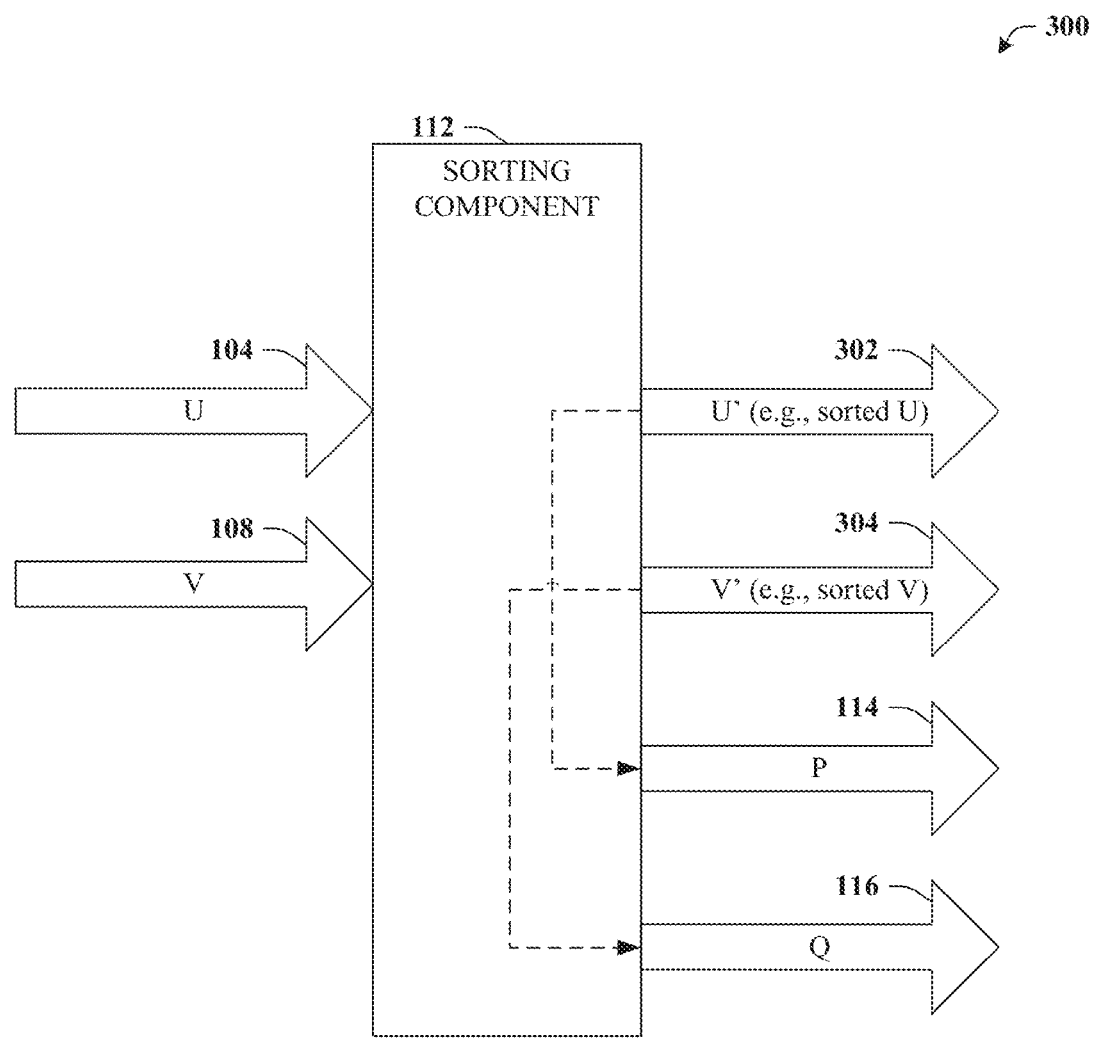
FIG. 3 illustrates a block diagram of a system that can provide additional detail with respect to sorting component in accordance with certain embodiments of this disclosure.

FIG. 3 depicts system 300 that shows additional detail with respect to sorting component 112. Sorting component can receive (e.g., from receiving component 102) feature vectors U and V (e.g., feature vectors 104, 108). The dimensions of U and V might be in an arbitrary order. For example, if U and V represent images (e.g., image 202), then the order of U and V might be according to the order of the various pixels from the top-left pixel to the bottom-right pixel, row-by-row or in a raster fashion. If U and V represent audio (e.g., audio 204), then the order of U and V might be according to time from the beginning of the audio to the end. If U and V represent text (e.g., text 206), then the order of U and V might be according to the order of the first instance of a word in the texts or according to alphabetical order.

Sorting component 112 can be configured to construct U' and V', which can include the same d dimensions as U and V, respectively, each with the same corresponding value but sorted based upon a sequential ordering for the values of those d dimensions. For example, consider reference text (e.g., reference object 106) that includes 4 different words and an associated comparison text that also includes the same 4 words. First feature vector 104 (e.g., U) includes 4 dimensions (e.g., d=4), and the values of each of those 4 dimensions correspond to the number of times the particular word occurred in the reference text. Second feature vector 108 (e.g., V) is similarly represented. According to this example, suppose the following:

4-Dimensional Vector U    4-Dimensional Vector V
$u_1$=Apple[7]            $v_1$=Apple[5]
$u_2$=Banana[10]          $v_2$=Banana[13]
$u_3$=Carrot[2]           $v_3$=Carrot[2]
$u_4$=Zoo[4]              $v_4$=Zoo[6].

Here the first dimension of U (e.g., $u_1$) is the word "Apple" and the value of that dimension is "7" because "Apple" appears in reference text seven times. Since U and V are both ordered alphabetically (e.g., based upon parameters for the initial construction of U and V), the first dimension of V (e.g., $v_1$) is also "Apple" and the corresponding value is "5," indicating "Apple" appears in the comparison text five times. The second dimension of U and V is "Banana" with an associated value of "10" for U and 13 for V, indicating "Banana" appears in the reference text ten times and the comparison text thirteen times. The third and fourth dimensions of U and V are "Carrot" and "Zoo," respectively, with associated values of "2" and "4," respectively for U and "2" and "6," respectively for V.

In order to construct U' (e.g., feature vector 302) and V' (e.g., feature vector 304), sorting component 112 can order the dimensions of U and V based upon a sequential ordering of the values of those dimensions for both vectors 104, 108. In one or more embodiments, the sequential ordering can be descending according to dimension values. In other embodiments, the sequential ordering can be ascending according to dimension values. In the example below, U' and V' are constructed according to descending sequential ordering. Thus, U' and V' can be:

4-Dimensional Vector U'   4-Dimensional Vector V'
$u'_1$=Banana[10]         $v'_1$=Banana[13]
$u'_2$=Apple[7]           $v'_2$=Zoo[6]
$u'_3$=Zoo[4]             $v'_3$=Apple[5]
$u'_4$=Carrot[2]          $v'_4$=Carrot[2].

Feature vectors 302, 304 (e.g., U' and V') can then be employed for constructing rank vectors 114 and 116 (e.g., P and Q), respectively. Rank vectors P and Q can be constructed by dropping the values associated with the dimensions of U and V, effectively replacing those values with the ordered rank (or a rank function) established by U' and V'. Thus, 4-Dimensional Vector P    4-Dimensional Vector Q
$p_1$=Apple[2]            $q_1$=Apple[3]
$p_2$=Banana[1]           $q_2$=Banana[1]
$p_3$=Carrot[4]           $q_3$=Carrot[4]
$p_4$=Zoo[3]              $q_4$=Zoo[2].

Rank vectors P and Q preserve the order of U and V and the dimension ranks established by U' and V', even though P and Q do not necessarily preserve the actual values of U and V (or U' and V') dimensions. Because rank vectors P and Q are less complex than feature vectors U and V, computations associated with P and Q can be more efficient and/or less resource-intensive, particularly where d is large or where the values of d are large or complex. In certain domains, the values of feature vector are not as important as their relative ordering.

For instance, due to ease of conceptual understanding, the above examples of U, V, U', V', P, and Q were illustrated in connection with text 206, however, one can readily appreciate a similar example with respect to image 202, where the values of U and V are associated with pixels of the respective images (e.g., reference and comparison images), or with respect to audio 204, where the values of U and V are associated with wavelets from the respective audio tracks (e.g., reference and comparison audio). In domains associated with illumination-invariant image fingerprinting, volume-invariant audio fingerprinting, biometric applications, and so forth, the order of dimensions of the feature vectors can be more significant and/or relevant than their associated values.

For example, consider a reference image, and a comparison image that is identical to the reference image but for a much higher illumination. Associated feature vectors for those two images (e.g., where each vector dimension is associated with a corresponding pixel value) might include values that are dramatically dissimilar. Therefore, conventional distance metrics that determine the distance between U and V based upon the distance between the individual dimensions might be large and U and V might be deemed dissimilar. However, the ranks obtained by sorting those values might be very similar or even identical. Thus, according to numerous applications, rank can be more significant for comparing objects, and further, transformations applied to rank vectors can be more efficient as well.

Referring again to FIG. 1, comparing component 118 can be configured to determine consistency score 122 between P and Q. Optionally, consistency score 122 can be determined based upon parameter 120. Parameter 120 can indicate whether to use an indicator function or a distance measure for determining consistency score 122. Additional detail in connection with the indicator function, distance measure, and consistency score 122 is provided infra in connection with FIG. 4.

Matching component 124 can be configured to identify sufficient match 126 between at least a portion of the reference object and at least a portion of the comparison object based upon consistency score 122 between P and Q. Consistency score 122 between P and Q (e.g., rank vectors 114, 116) can be/represent a proxy for a consistency between U and V (e.g., feature vectors 104, 108) and/or between reference object 106 and comparison object 110. Hence, sufficient match 126 for either of P and Q or U and V can imply a sufficient match between reference object 106 (or a portion of reference object 106) and comparison object 110 (or an associated portion of comparison object 110), particularly in domains where dimension rank maintains a relative degree of significance.

Figure 4:
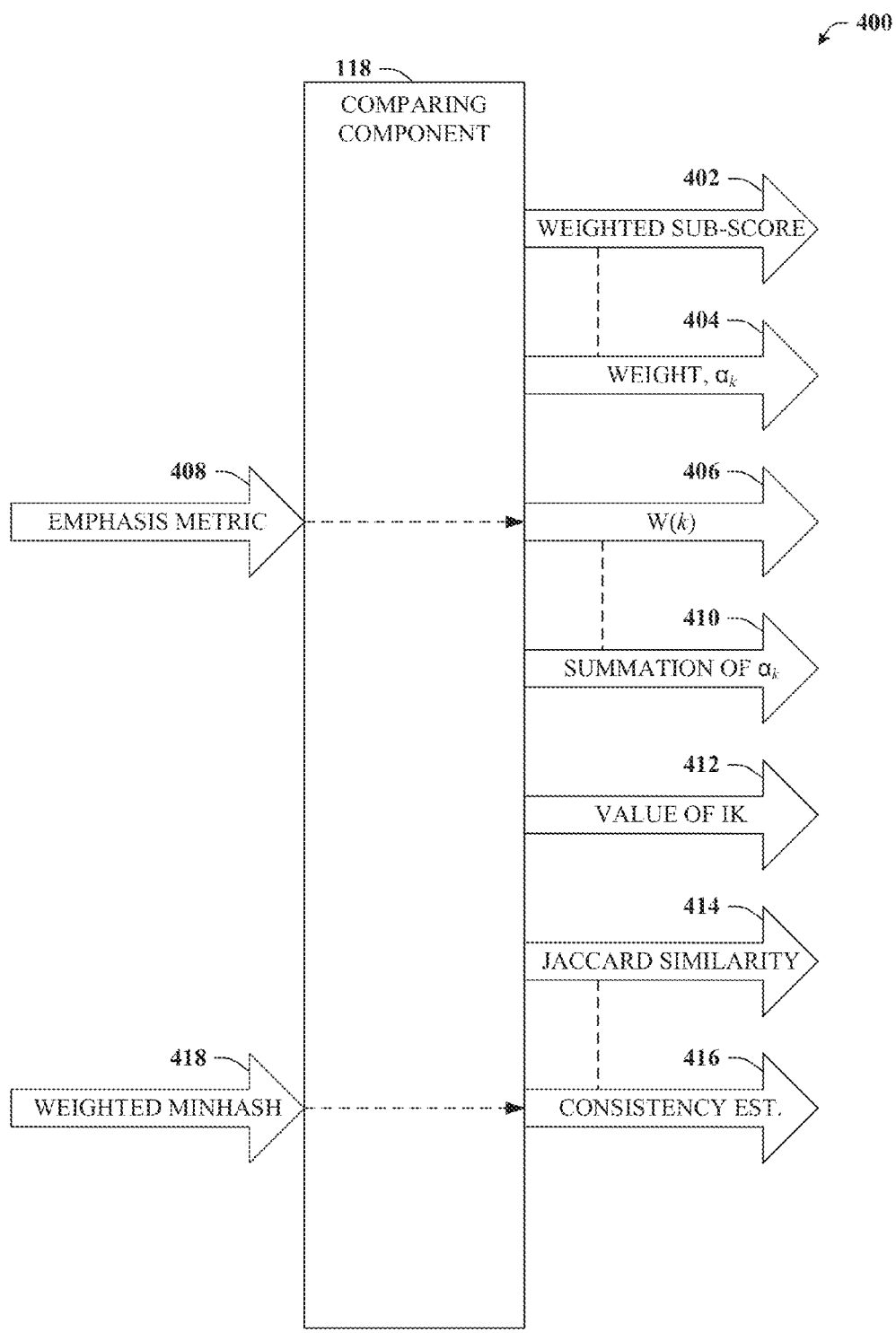
FIG. 4 illustrates a block diagram of a system that can provide additional detail relating to comparing component for determining consistency score in accordance with certain embodiments of this disclosure.

With reference now to FIG. 4, system 400 is depicted. System 400 illustrates additional detail relating to determining consistency score 122. As detailed with respect to FIG. 1, comparing component 118 can determine consistency score 122. Additional determinations can be made as well, e.g., determinations utilized to ultimately determine consistency score 122. In one or more embodiments, comparing component 118 can determine weighted sub-score 402 between P and Q at rank k, where k is an integer from 1 to d. Weighted sub-score 402 can be a component of a determination of consistency score 122. For example, consider the following measure of consistency between P and Q at rank k $C(P,Q,k)$=count(items in to $k$ in rank $P$ AND top $k$ in rank $Q$)=

$$C(P, Q, k) = \sum_{i=1}^{d} f, \text{ where } f = p_i \leq k \,\&\&\, q_i \leq k. \tag{1}$$

In equation (1), f can be the indicator function associated with parameter 120. In this example, the indicator function (e.g., $p_i \le k$ && $q_i \le k$) can return 1 when both conditions are true, and 0 otherwise. If P and Q both include a particular element within the first k elements, then the condition will be true, and false otherwise. For instance, if k=1 then the indicator function will result in a 1 if the highest rank dimension of P is equal to the highest rank dimension of Q. In the example above, the word "Banana" is the highest rank for both P and Q. Thus, if k=1, then the indicator function will return true. If k=2, then the first iteration of the indicator function will return true (e.g., Banana is less than or equal to 2 for both P and Q), while the second iteration will return false (e.g., Apple is less than or equal to rank 2 for P, but not for Q). Summing those two iterations for k=2 yields, (1+0)=1, which implies a consistency between P and Q at rank k=2 is 1 out of possible values of 0, 1, or 2. C(P, Q, k) operates as a summation of the indicator function for a given rank k Typically, it is desirable to utilize small values of k. In embodiments where an indicator function is not utilized, parameter 120 can instead indicate that a distance measure can be employed. For example, a distance between W(P) and W(Q) (detailed infra) can be utilized. The distance can relate to a standard distance metric, L1, or to a Jaccard distance metric, for example.

In one or more embodiments, comparing component 118 can utilize or determine $\alpha_k$ as a weight (e.g., weight 404) for a sub-score (e.g., weighted sub-score 402) between P and Q at rank k, wherein $\beta_k$ is non-negative. For example, different consistencies between P and Q can result as k changes from 1 to d. A single, aggregate consistency can be utilized and that aggregate consistency can be a weighted combination of various values of k, wherein $\beta_k$ can be the weight for the consistency of rank k, which can be a weighted sum. Typically, it is desirable have a small weight 404 (e.g., small $\beta_k$) when k is large. The aggregate consistency can be defined as a weighted combination according to the following:

$$C(P, Q) = \sum_{k=1}^{d} \alpha_k C(P, Q, k) = C(P, Q) = \sum_{k=1}^{d} \alpha_k \sum_{i=1}^{d} p_i \le k \,\&\&\, q_i \le k. \quad (2)$$

From these two sums (e.g., the summation of $\alpha_k$ and the summation of the indicator function) of equation (2), the summation order can be swapped based upon an algebraic transformation. For example, $$C(P, Q) = \sum_{i=1}^{d}\sum_{k=1}^{d} \alpha_k [\max(p_i, q_i) \le k] = C(P, Q) = \sum_{i=1}^{d} \sum_{k=\max(p_i, q_i)}^{d} \alpha_k. \quad (3)$$

Based upon equation (3), C(P, Q) can take a summation of $\alpha_k$ elements in which the summation begins with the larger of either $p_i$ or $q_i$, and sums the remaining $\alpha_k$ elements until the end, or d.

In one or more embodiments, comparing component 118 can select a non-negative and non-increasing function 406, denoted W(k), based upon emphasis metric 408. Emphasis metric 408 can be based upon a degree of emphasis to place on the higher ranking dimensions of P and Q. Upon selection of function 406, comparing component 118 can employ function 406 to sum $\alpha_k$ from k to d, which is denoted summation 410. Since $\alpha_k$ is non-negative, function 406 can be defined as, $$W(k) = \sum_{k'=k}^{d} \alpha_{k'}. \quad (4)$$

Thus, $$C(P, Q) = \sum_{i=1}^{d} \min[W(p_i), W(q_i)] \quad (5)$$

In one or more embodiments, comparing component 118 can determine a value of an intersection kernel (IK) 412 computed for weighted vectors W(P) and W(Q). Equation (5) can represent the value of an intersection kernel 412. In certain embodiments, W(k) can, by definition, be a non-increasing function. Hence, by replacing the values of U and V dimensions with a function of the rank of those dimensions, particularly where the function of the rank is non-increasing and non-negative, consistency between U and V can be determined efficiently.

In one or more embodiments, comparing component 118 can determine Jaccard similarity 414 for functions applied to rank vectors P and Q, denoted J(W(P), W(Q)). In certain embodiments, since max(x,y)=x+y-min(x,y), it follows that Jaccard similarity 414 can be:

$$J(W(P),W(Q))=\Sigma\min(W(P),W(Q))/\Sigma\max(W(P),W(Q))=J(W(P),W(Q))=C(P,Q)/[\Sigma W(P)+\Sigma W(Q)-C(P,Q)]. \quad (6)$$

In certain embodiments, according to equation (6), all P's and Q's are permutations of one another as are values for W(P). Thus, $$\Sigma W(P)=\Sigma W(Q)=S \quad (7)$$

where S in equation (7) is a constant. It follows, therefore, that $$J(W(P),W(Q))=C(P,Q)/[S-C(P,Q)]. \quad (8)$$

In certain embodiments, J(W(P), W(Q)) and C(P, Q) are functions of one another, and particularly increasing functions of one another. Therefore, the task of estimating C(P, Q) (e.g., consistency score 122 between P and Q) can be equivalent to estimating J(W(P), W(Q)). Also, the task of retrieving data points with large C(P,Q) can be equivalent to retrieving data points under J(W(P), W(Q)).

In one or more embodiments, comparing component 118 can determine consistency score 122 between P and Q based upon consistency score estimation 416 associated with J(W(P), W(Q)). Consistency score estimation 416 can be determined based upon application of weighted minhash algorithm 418, which can be utilized, e.g., to retrieve data points with large C(P, Q) by leveraging J(W(P), W(Q)).

Figure 5:
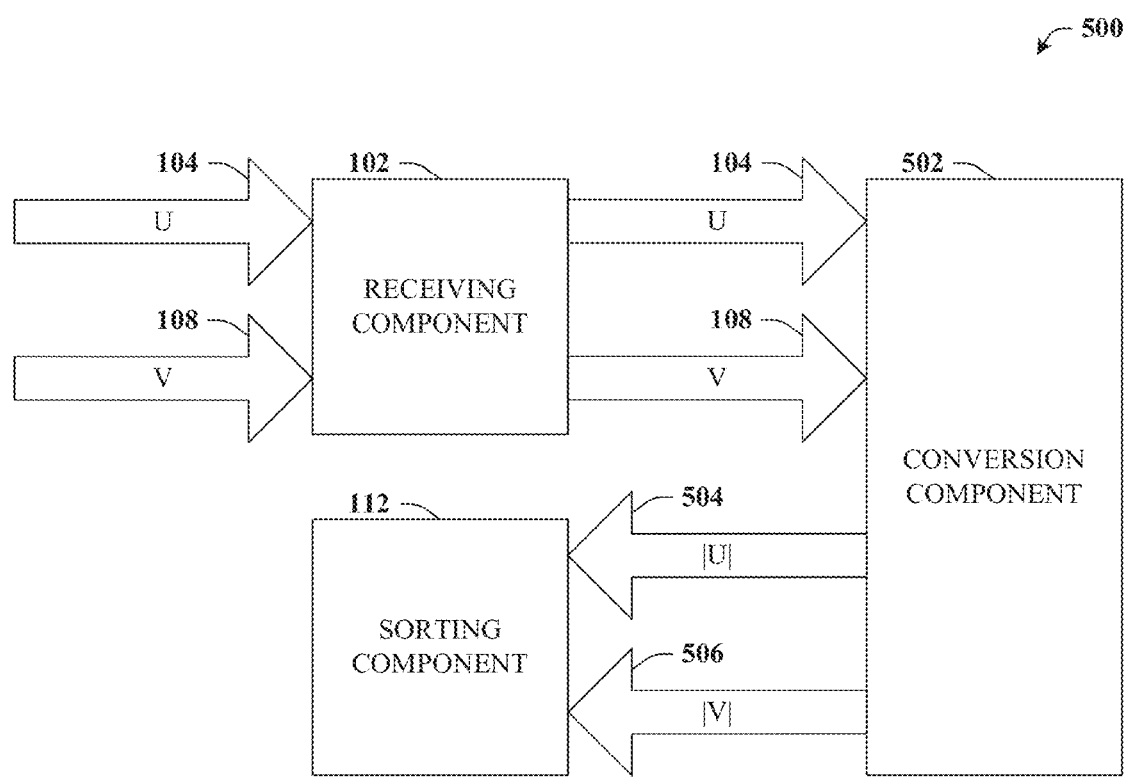
FIG. 5 illustrates a block diagram of an example system that can provide for rank vectors with dimensions ordered according to absolute values in accordance with certain embodiments of this disclosure.

Turning now to FIG. 5, system 500 is illustrated. System 500 can provide for rank vectors with dimensions ordered according to absolute values. System 500 can include receiving component 102 that can receive feature vectors 104, 108 (e.g., U and V) and sorting component 112 that can construct associated rank vectors, P and Q, based upon a sequential ordering of U and V dimensions. System 500 can also include conversion component 502 that can be configured to convert values of dimensions of U and V to corresponding absolute values. Sorting component 112 can in that case sort |U| and |V| based upon the absolute values of those feature vectors 504, 506.

In one or more embodiments, conversion component 502 can convert to absolute values based upon halfwave rectification, which replaces a dimension value with a value pair and doubles the total number of dimensions, d, of feature vectors U and V. Thus, |U| and |V| can be 2*d-dimensional feature vectors. Conversion component 502 can replace the values of U and V dimensions with a pair of values defined as, (max(x, 0), max(−x, 0)), which can then be sorted by sorting component 112 and used to construct associated rank vectors. It is appreciated that during subsequent operations, at least half of the 2*d dimension values of |U| and |V| will be zero. Hence, comparing component 118 can set W(k)=0 for k>d, therefore half of the d dimensions will be zeroed out and the process can be equivalent to maintaining d dimensions rather than 2*d dimensions.

FIGS. 6-9 illustrate various methodologies in accordance with certain embodiments of this disclosure. While, for purposes of simplicity of explanation, the methodologies are shown and described as a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media.

Figure 6:
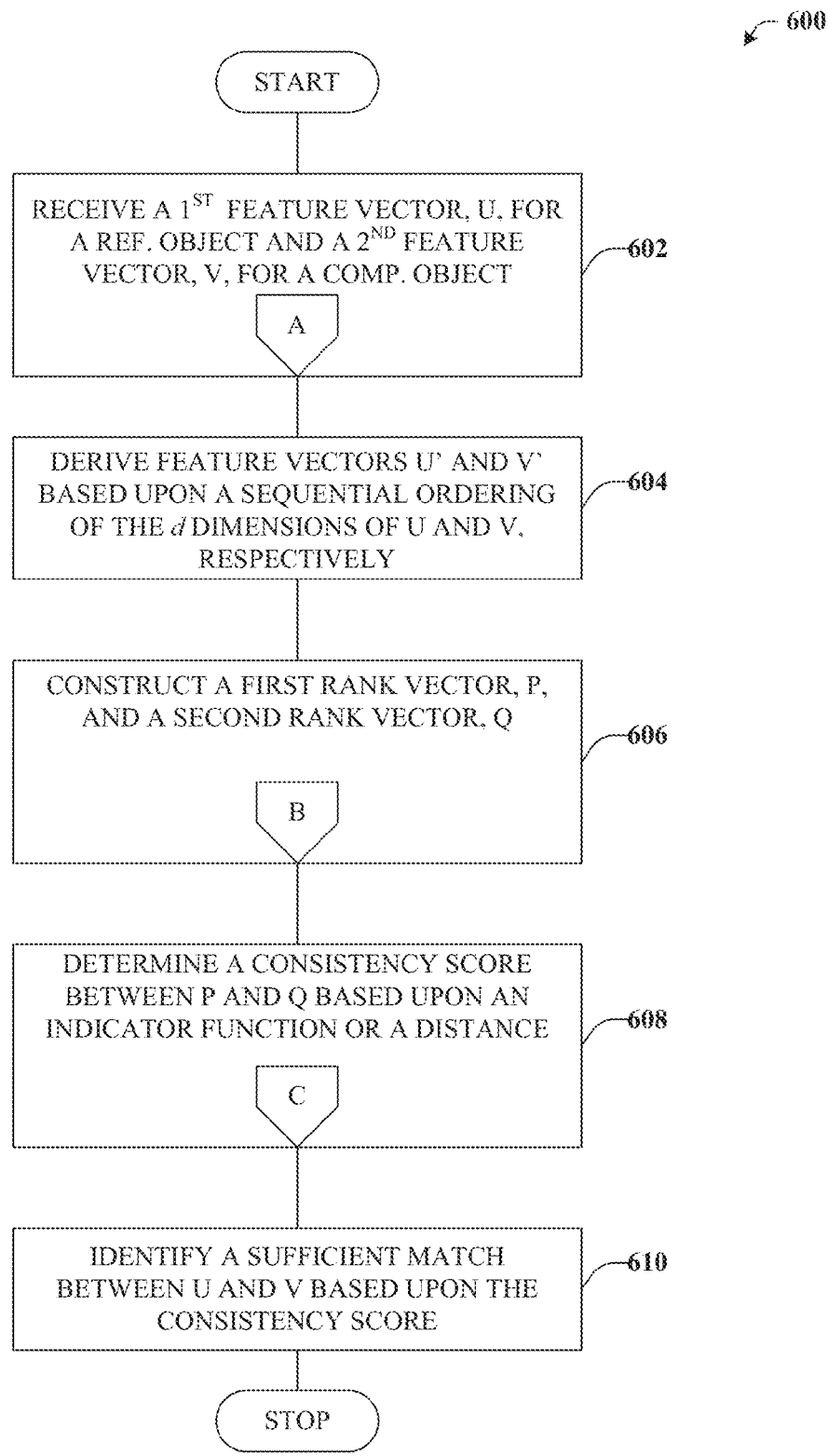
FIG. 6 illustrates an example methodology for matching objects represented by feature vectors based upon a rank or order of feature vector dimensions rather than based upon values of those dimensions in accordance with certain embodiments of this disclosure.

Turning now to FIG. 6, exemplary method 600 is depicted. Method 600 provides for matching objects represented by feature vectors based upon a rank or order of feature vector dimensions rather than based upon values of those dimensions. Generally, at reference numeral 602, a first feature vector, U, associated with a reference object can be received (e.g., by a receiving component). A second feature vector, V, associated with a comparison object can also be received (e.g., by a receiving component). Feature vectors U and V can include d dimension, where d can be substantially any positive integer. Optionally, values for dimensions of U and V can be converted to absolute values by process of insert "A", which is detailed in connection with FIG. 7A.

At reference numeral 604, feature vectors U' and V' can be derived (e.g., by a sorting component) based upon a sequential ordering of the d dimensions of U and V, respectively. At reference numeral 606, a first rank vector, P, can be constructed (e.g., by a sorting component) by replacing values of the d dimensions of U with a rank according to the sequential ordering of U'. In addition, a second rank vector, Q, can be constructed (e.g., by a sorting component) by replacing values of the d dimensions of V with a rank according to the sequential ordering of V'. Optionally, various types of sequential ordering can be performed by proceeding to insert "B", which is detailed in connection with FIG. 7B.

At reference numeral 608, a consistency score between rank vectors P and Q can be determined (e.g., by a comparing component). The consistency score can be determined based upon an indicator function or based upon a distance metric. In embodiments where an indicator function is employed, the indicator function can be summed at various ranks, k. Optionally, various additional features or aspects related to determining the consistency score can be processed by following insert "C", which is further detailed with reference to FIG. 8.

At reference numeral 610, a sufficient match between feature vectors U and V can be identified (e.g., by a matching component) based upon the consistency score between rank vectors P and Q. In some embodiments, a sufficient match between U and V can likewise imply a sufficient match between the reference object and the comparison object discussed at reference numeral 602. Accordingly, a sufficient match between at least a portion of the reference object and at least a portion of the comparison object can be identified (e.g., by a matching component) based upon the consistency score between rank vectors P and Q.

Figure 7A:
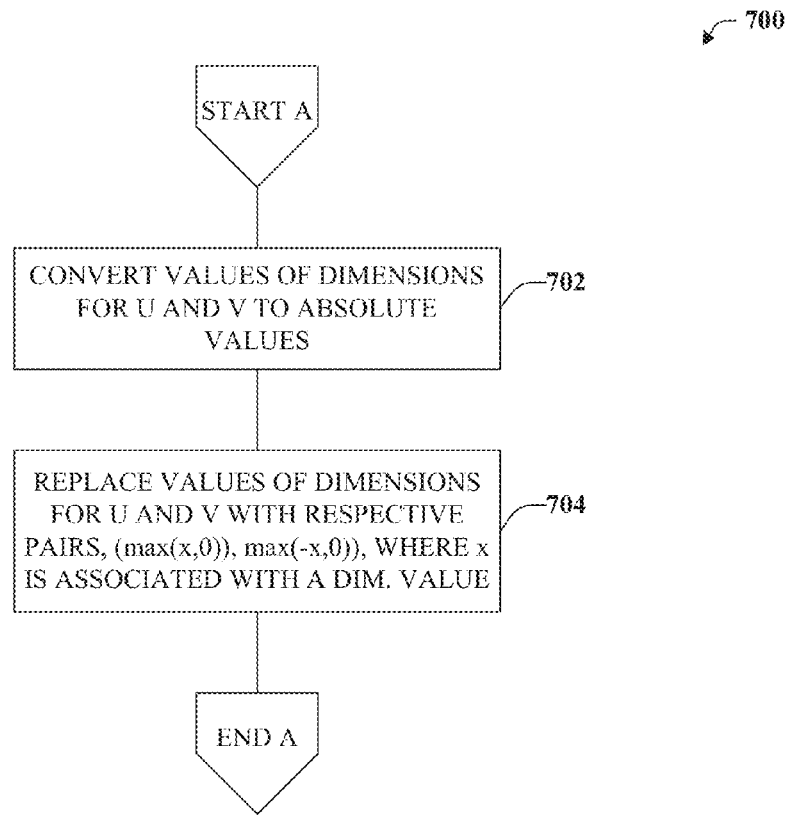
FIG. 7A illustrates an example methodology for converting received dimension values based upon associated absolute values in accordance with certain embodiments of this disclosure.
Figure 7B:
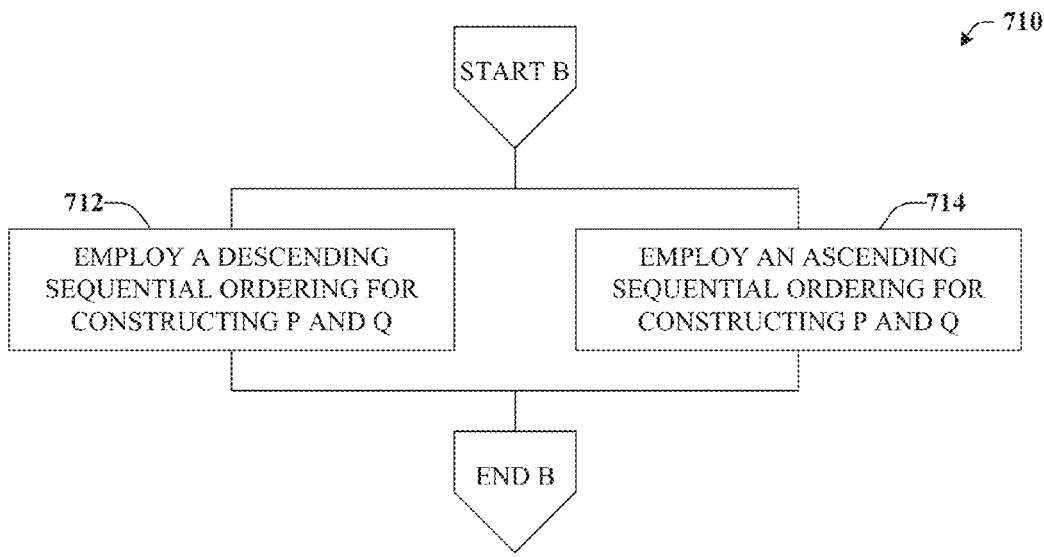
FIG. 7B illustrates an example methodology for providing various ways of sequential ordering that can be employed when construction rank vectors P and Q in accordance with certain embodiments of this disclosure.

Referring now to FIGS. 7A and 7B, exemplary methods 700 and 710, respectively are provided. With particular reference to FIG. 7A, method 700 provides for converting received dimension values based upon associated absolute values. For example, at reference numeral 702, values of dimensions for feature vectors U and V can be converted to absolute values. At 704, such a conversion can be accomplished by way of halfwave rectification, by replacing values of dimensions for U and V with respective value pairs. The respective values pairs can be represented as (max(x,0), max(−x,0)), where x is associated with a given dimension value of either U or V. Thus, inputs for feature vectors U and V received at reference numeral 604 and used to derive U' and V' can be based either on U and V or the absolute values for U and V.

Referring to FIG. 7B, method 710 provides for various ways of sequential ordering that can be employed when constructing rank vectors P and Q, e.g., at reference numeral 606 of FIG. 6. For example, in some embodiments, a descending sequential ordering can be employed for constructing rank vectors P and Q, which is depicted by reference numeral 712. In that case, the largest values of U and V dimensions will be associated with rank 1, and so on. In other embodiments, e.g., at reference numeral 714, an ascending sequential ordering can be employed for constructing P and Q. In this case, the smallest values of U and V can be assigned to rank 1. It is understood that respective values of U and V are not required to be numeric so long as they can be ordered according to a sequence based upon some measure of size or magnitude.

Figure 8:
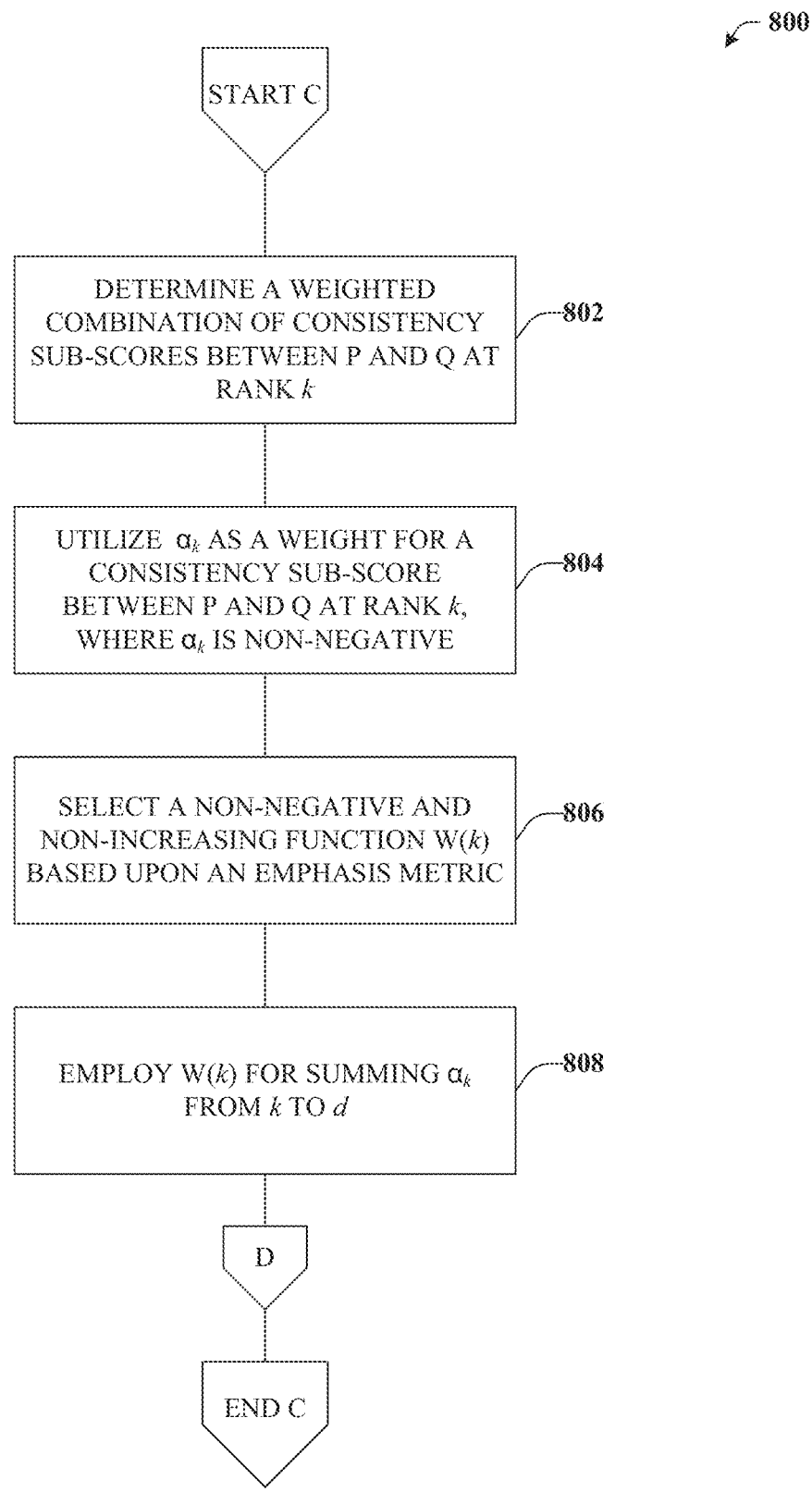
FIG. 8 illustrates an example methodology for providing additional detail with regard to determining the consistency score between rank vectors P and Q in accordance with certain embodiments of this disclosure.

Turning now to FIG. 8, example method 800 is illustrated. Method 800 relates to additional detail with regard to determining the consistency score between rank vectors P and Q as discussed in connection with reference numeral 608 of FIG. 6. For example, at reference numeral 802, a weighted combination of consistency sub-scores between P and Q at rank k can be determined, where k is an integer from 1 to d.

At reference numeral 804, $\alpha_k$ can be utilized or determined as a weight for a sub-score between P and Q at rank k, where $\alpha_k$ is non-negative. The weighted sub-scores can be summed to provide an aggregate consistency score. At reference numeral 806, a non-negative and non-increasing function, W(k), can be selected based upon an emphasis metric. The emphasis metric can be utilized to determine a degree of emphasis to place on the beginning of the ordered dimensions relative to those at the end.

At reference numeral 808, W(k) can be employed for summing $\alpha_k$ from k to d. Before ending method 800, insert "D" can be followed, which is detailed in connection with FIG. 9.

Figure 9:
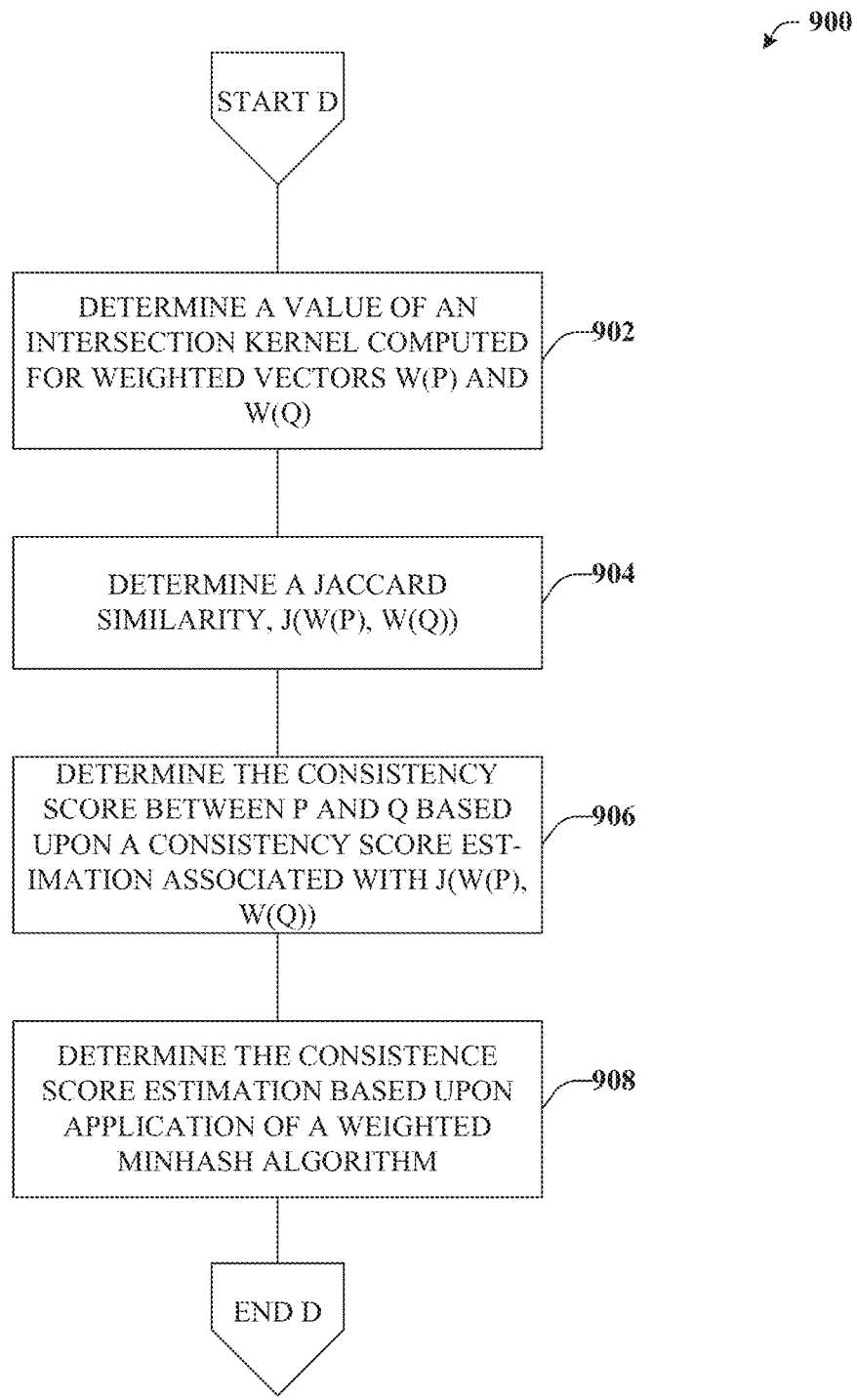
FIG. 9 illustrates an example methodology for utilizing a Jaccard similarity for determining the consistency score between rank vectors P and Q in accordance with certain embodiments of this disclosure.

Referring to FIG. 9, method 900 is illustrated. Method 900 relates to utilizing a Jaccard similarity for determining the consistency score between rank vectors P and Q as discussed in connection with reference numeral 608 of FIG. 6. At reference numeral 902, a value of an intersection kernel computed for weighted vectors W(P) and W(Q) can be determined. Since, W(k) can be non-increasing, the values of U and V dimensions can be replaced with a function of the rank when constructing P and Q. That function of rank can be non-negative and non-increasing.

At reference numeral 904, a Jaccard similarity, J(W(P), W(Q)) can be determined. Since all P and Q are permutations of one another, all W(P) and W(Q) are permutations of one another. Since max(x,y)=x+y−min(x,y), then $\Sigma_i$ max(W($p_i$), W($q_i$))=ΣW(P)+ΣW(Q)−$\Sigma_i$ min(W($p_i$), W($q_i$))=ΣW(P)+ΣW(Q)−C(P, Q), where ΣW(P)+ΣW(Q) is a constant. Therefore, J(W(P), W(Q)) and a consistency, C(P, Q) can be increasing functions of one another.

At reference numeral 906, the consistency score between P and Q determined at reference numeral 608 can be determined based upon a consistency score estimation associated with J(W(P), W(Q)). At reference numeral 908, the consistency score estimation can be determined based upon application of a weighted minhash algorithm. For example, such can be employed for efficiently retrieving data points with large C(P, Q).

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 10:
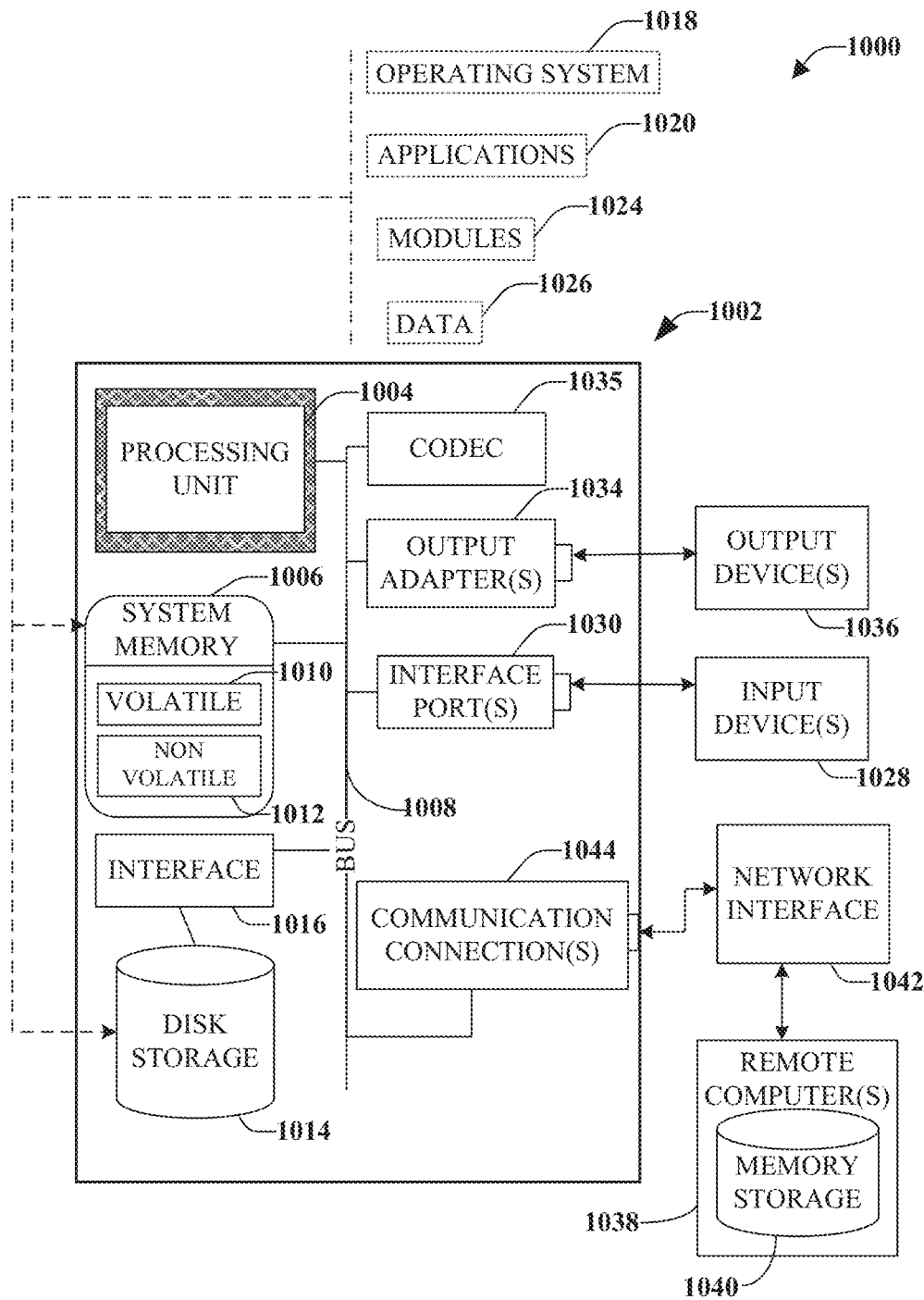
FIG. 10 illustrates an example schematic block diagram for a computing environment in accordance with certain embodiments of this disclosure.

With reference to FIG. 10, a suitable environment 1000 for implementing various aspects of the claimed subject matter includes a computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1035 may include at least one of an encoder or decoder, wherein the at least one of an encoder or decoder may consist of hardware, software, or a combination of hardware and software. Although, codec 1035 is depicted as a separate component, codec 1035 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016. It is appreciated that storage devices 1014 can store information related to a user. Such information might be stored at or provided to a server or to an application running on a user device. In one embodiment, the user can be notified (e.g., by way of output device(s) 1036) of the types of information that are stored to disk storage 1014 and/or transmitted to the server or application. The user can be provided the opportunity to opt-in or opt-out of having such information collected and/or shared with the server or application (e.g., by way of input from input device (s) 1028).

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
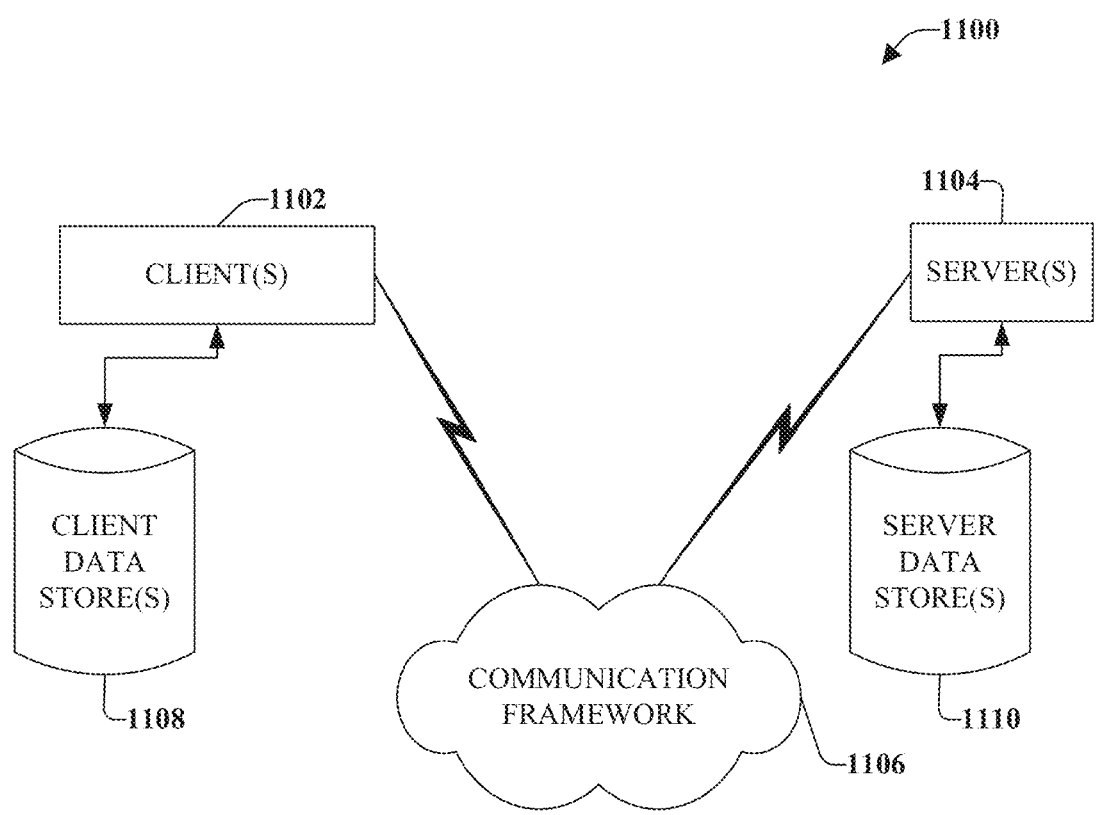
FIG. 11 illustrates an example block diagram of a computer operable to execute certain embodiments of this disclosure.

Referring now to FIG. 11, there is illustrated a schematic block diagram of a computing environment 1100 in accordance with this specification. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a cookie and/or associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A system, comprising:
    a memory that stores computer executable components; and
    a microprocessor that executes the following computer executable components stored in the memory:
        a receiving component that receives a first feature vector, U, associated with a reference object and a second feature vector, V, associated with a comparison object, wherein U and V are d-dimensional vectors;
        a sorting component that constructs a first rank vector, P, based upon a sequential ordering of dimensions of U, and a second rank vector, Q, based upon a sequential ordering of dimensions of V;
        a conversion component that converts values of dimensions of U and V to corresponding absolute values based upon halfwave rectification;
        a comparing component that determines a consistency score between P and Q; and
        a matching component that identifies a sufficient match between at least a portion of the reference object and at least a portion of the comparison object based upon the consistency score between P and Q.

2. The system of claim 1, wherein dimensions from 1 to d associated with U and V relate to features of the reference object and the comparison object, respectively, wherein the features are at least one of pixel values, wavelet values, word occurrence counts, other image features, audio features, or text features.

3. The system of claim 1, wherein the comparing component determines the consistency score between P and Q based upon an indicator function.

4. The system of claim 1, wherein the comparing component determines the consistency score between P and Q based upon a distance measure between W(P) and W(Q), wherein W(P) is a weighted vector associated with P in which dimensions are a function of rank and W(Q) is a weighted vector associated with Q in which dimensions are a function of rank.

5. The system of claim 1, wherein the sequential ordering is at least one of descending according to dimension values or ascending according to dimension values.

6. The system of claim 1, wherein the comparing component determines a weighted combination of sub-scores between P and Q at rank k, where k is an integer from 1 to d.

7. The system of claim 6, wherein the comparing component utilizes $\alpha_k$ as a weight for a sub-score between P and Q at rank k, wherein $\alpha_k$ is non-negative.

8. The system of claim 7, wherein the comparing component selects a non-negative and non-increasing function, W(k), based upon an emphasis metric.

9. The system of claim 8, wherein the comparing component employs W(k) to sum $\alpha_k$ from k to d.

10. The system of claim 9, wherein the comparing component determines a value of an intersection kernel computed for weighted vectors, W(P) and W(Q).

11. The system of claim 10, wherein the comparing component determines a Jaccard similarity, J(W(P), W(Q)), for rank vectors P and Q.

12. The system of claim 11, wherein the comparing component determines the consistency score between P and Q based upon a consistency score estimation associated with J(W(P), W(Q)).

13. The system of claim 12, wherein the comparing component determines the consistency score estimation associated with J(W(P), W(Q)) based upon application of a weighted minhash algorithm.

14. A method, comprising:
employing a microprocessor to execute computer executable components stored within a memory to perform the following:
receiving a first feature vector, U, associated with a reference object, and a second feature vector, V associated with a comparison object, wherein U and V each include d dimensions;
deriving feature vector U' based upon a sequential ordering of the d dimensions of U, and deriving feature vector V' based upon a sequential ordering of the d dimensions of V;
constructing a first rank vector, P, by replacing values of the d dimensions of U with a rank according to the sequential ordering of U', and constructing a second rank vector, Q, by replacing values of the d dimensions of V with a rank according to the sequential ordering of V';
determining a consistency score between rank vectors P and Q and a weighted combination of sub-scores between P and Q at rank k, where k is an integer from 1 to d, wherein $\alpha_k$ is utilized as a weight for a sub-score between P and Q at rank k, where $\alpha_k$ is non-negative; and
identifying a sufficient match between at least a portion of the reference object and at least a portion of the comparison object based upon the consistency score between rank vectors P and Q.

15. The method of claim 14, further comprising employing a descending sequential ordering for constructing P and Q or employing an ascending sequential ordering for constructing P and Q.

16. The method of claim 14, further comprising:
selecting a non-negative and non-increasing function W(k) based upon an emphasis metric;
employing W(k) for summing $\alpha_k$ from k to d;
determining a value of an intersection kernel computed for weighted vectors W(P) and W(Q); and
determining a Jaccard similarity, J(W(P), W(Q)).

17. The method of claim 16, wherein the consistency score between P and Q is determined based upon a consistency score estimation associated with J(W(P), W(Q)).

18. The method of claim 17, wherein the consistency score estimation associated with J(W(P), W(Q)) is determined based upon application of a weighted minhash algorithm.

19. An apparatus, comprising:
means for receiving a first feature vector, U, associated with a reference object, and a second feature vector, V associated with a comparison object, wherein U and V include d dimensions, where d is any positive integer;
means for deriving feature vector U' based upon a sequential ordering of the d dimensions of U, and deriving feature vector V' based upon a sequential ordering of the d dimensions of V;
means for constructing a first rank vector, P, by replacing values of the d dimensions of U with a rank according to the sequential ordering of U', and constructing a second rank vector, Q, by replacing values of the d dimensions of V with a rank according to the sequential ordering of V';
means for utilizing halfwave rectification for converting values of dimensions of U and V to corresponding absolute values;
means for determining a consistency score between rank vectors P and Q; and
means for identifying a sufficient match between the reference object and the comparison object based upon the consistency score between rank vectors P and Q.

20. The apparatus of claim 19, further comprising means for determining a Jaccard similarity, J(W(P), W(Q)).

* * * * *